(12) United States Patent
Hann

(10) Patent No.: US 8,073,003 B2
(45) Date of Patent: Dec. 6, 2011

(54) GENERAL PURPOSE PHYSICAL DATA TRANSMISSION PORT

(75) Inventor: Kenneth Hann, Espoo (FI)

(73) Assignee: Tellabs Oy, Espoo (FI)

( * ) Notice: Subject to any disclaimer, the term of this patent is extended or adjusted under 35 U.S.C. 154(b) by 1134 days.

(21) Appl. No.: 11/845,876

(22) Filed: Aug. 28, 2007

(65) Prior Publication Data

US 2008/0310441 A1 Dec. 18, 2008

(30) Foreign Application Priority Data

Aug. 28, 2006 (FI) ...................................... 20060769

(51) Int. Cl.
*H04L 12/66* (2006.01)
(52) U.S. Cl. .................... 370/463; 370/465; 370/395.53
(58) Field of Classification Search .................. 370/230, 370/465, 401, 384, 419, 463; 340/568.4; 713/400; 379/382
See application file for complete search history.

(56) References Cited

U.S. PATENT DOCUMENTS

| | | | |
|---|---|---|---|
| 5,249,183 A | 9/1993 | Wong et al. | |
| 5,327,433 A * | 7/1994 | Hall | 370/384 |
| 5,410,535 A | 4/1995 | Yang et al. | |
| 6,072,803 A | 6/2000 | Allmond et al. | |
| 6,332,166 B1 | 12/2001 | Cranford, Jr. et al. | |
| 6,848,947 B2 * | 2/2005 | Chimiak | 439/638 |
| 7,218,609 B2 * | 5/2007 | Borella et al. | 370/230 |
| 7,463,731 B2 * | 12/2008 | Beyda et al. | 379/387.02 |
| 2003/0208713 A1 * | 11/2003 | Evans | 714/742 |
| 2003/0211782 A1 | 11/2003 | Esparaz et al. | |
| 2004/0085157 A1 * | 5/2004 | Richardson | 333/181 |
| 2005/0071704 A1 * | 3/2005 | Friesen et al. | 713/400 |
| 2007/0035282 A1 * | 2/2007 | Petersen | 323/282 |

FOREIGN PATENT DOCUMENTS

| | | |
|---|---|---|
| CN | 1481085 A | 3/2004 |
| EP | 0666620 A2 | 8/1995 |
| GB | 2276048 A | 9/1994 |
| GB | 2402269 A | 12/2004 |

OTHER PUBLICATIONS

European Search Report, dated Feb. 18, 2011, in EP 07114407.

* cited by examiner

*Primary Examiner* — Hassan Kizou
*Assistant Examiner* — Emmanuel Maglo
(74) *Attorney, Agent, or Firm* — Young & Thompson

(57) ABSTRACT

A physical data transmission port in a network element of a data network, suited for realizing for instance both an electric packet switched Ethernet connection and an electric time slot switched E1/T1 connection. It has surprisingly been found out that the electric connector (101) and connected circuits provided in the network element can be arranged to support more than one wiring standard. For example the generally used RJ connector can be arranged to support both the RJ45 wiring standard and the RJ48c wiring standard, in which case, with the electric connector (101), there can be realized a physical data transmission port that is suited for realizing both an 10/100 Ethernet connection and an E1/T1 connection.

12 Claims, 3 Drawing Sheets

GENERAL PURPOSE PHYSICAL DATA TRANSMISSION PORT

FIELD OF THE INVENTION

The invention relates to a physical data transmission port in a network element of a data network, suited for realizing both an electric packet switched Ethernet connection and an electric time slot switched E1/T1 connection.

BACKGROUND OF THE INVENTION

The network elements in a data network are often arranged to transmit and receive digital data flows representing various data transmission protocols. A network element, such as a loop access multiplexer arranged in a mobile phone network, can be for example arranged to connect both packet switched 10/100 Ethernet traffic and time slot switched E1/T1 traffic. Ethernet is described for example in the technical specification IEEE802.3 (Institute of Electrical and Electronics Engineers), E1 is described for example in the technical specification ITU-T G.703 (International Telecommunications Union), and T1 is described for example in the technical specification ANSI T1.102 (American National Standardization Institute).

In practical operation environments of network elements it is typical that some operation environments need a lot of 10/100 Ethernet connections and only a small quantity, if at all, of E1/T1 connections. Respectively some other operation environments need a lot of E1/T1 connections and only a small quantity, if at all, of 10/100-Ethernet connections. The described mutual differences between various operation environments must be taken into account when planning the structure and production of network elements.

DESCRIPTION OF THE PRIOR ART

In a prior art arrangement, various operation environments are taken into account by preparing different network element product variations with different physical Ethernet data transmission ports and different ratios in the numbers of physical E1/T1 data transmission ports. Each physical Ethernet data transmission port is arranged to be connected to a data cable transmitting Et10/100 Ethernet traffic, and each physical E1/T1 data transmission port is arranged to be connected to a data cable transmitting E1/T1 traffic. In this document, the term "physical data transmission port" refers to an interface device formed by a connector and other parts provided in a network element, to which interface device there can be connected a data cable through which the network element transmits and/or receives digital data. Several logic data transmission ports can be allocated in one single physical data transmission port. A single logic data transmission port can represent for instance a tunnel configured in the data network. Therefore we use, for the sake of clarity, the term "physical data transmission port" in this document. The maintenance of several product variations increases production expenses and makes production maintenance more difficult, even if the different product variations were realized by means of modular solutions. In addition, a network element especially designed for a certain operation environment cannot be transferred to another operation environment where the required ratio between the number of physical Ethernet data transmission ports and the number of physical E1/T1 data transmission ports is different from the original operation environment.

In another arrangement according to the prior art, the network element is provided with as many physical E1/T1 data transmission ports as are needed in the different operation environments, and with as many physical Ethernet data transmission ports as are needed in the different operation environments. Each physical Ethernet data transmission port is arranged to be connected to a data cable transmitting Ethernet traffic, and each physical E1/T1 data transmission port is arranged to be connected to a data cable transmitting E1/T1 traffic. If the network element is provided with the number of physical data transmission ports required by this arrangement and with a case sufficiently large in order to place all physical data transmission ports in the desired locations on the outer surface of the network element, this represents a remarkable share of the manufacturing expenses of the network element and also takes up a remarkable share of the physical space required by the network element in the hardware facilities of the operator. In the practical operation environment of the network element, a significant number of the physical data transmission ports remains, however, unused. In some operation environments, a significant number of the physical E1/T1 data transmission ports remains unused, and in some other operation environments, a significant number of the physical Ethernet data transmission ports remains unused.

SUMMARY OF THE INVENTION

The invention relates to a physical data transmission port of a network element, such as a loop access multiplexer in a mobile phone network, by means of which port the restrictions and drawbacks of the prior art can be eliminated or alleviated.

The invention also relates to a network element, such as a mobile phone network loop access multiplexer, by means of which element the restrictions and drawbacks of the prior art can be eliminated or alleviated.

In the present invention, it has surprisingly been found out that the electric connector provided in the network element and the connected circuits can be arranged to support more than just one wiring standard. For example, the generally used RJ connector can be arranged to support both the RJ45 wiring standard and the RJ48c wiring standard, in which case, by means of said electric connector, there can be realized a physical data transmission port that is suited for realizing both a 10/100 Ethernet connection and an E1/T1 connection.

By means of the invention, there are achieved remarkable advantages:

the production expenses of a network element are lower and the production management is easier than when using the above described arrangements according to the prior art, and the demand of space on the outer surface of the network element is smaller than when using the above described arrangement according to the prior art, because the number of the required physical data transmission ports is smaller; in that case the shape and physical size of the network element can be designed more freely.

The physical data transmission port according to the invention is characterized in that said physical data transmission port includes:

an electric connector provided with a set of connecting poles, first signal paths for connecting the connecting poles belonging to a first subset of said set according to a first wiring standard to a first interface unit, which is arranged to support a packet switched 10/100 Ethernet transmission protocol, and second signal paths for connecting the connecting poles belonging to a second subset of said set according to a second wiring standard to a second interface unit, which is arranged to support a time slot switched E1/T1 data transmission protocol.

The network element according to the invention is characterized in that said network element includes:
an electric connector provided with a set of connecting poles,
a first interface unit that is arranged to support a packet switched 10/100 Ethernet data transmission protocol,
a second interface unit that is arranged to support a time slot switched E1/T1 data transmission protocol,
first signal paths for connecting the connecting poles belonging to a first subset of said set according to a first wiring standard to said first interface unit, and
second signal paths for connecting the connecting poles belonging to a second subset of said set according to a second wiring standard to said second interface unit.

In this document, the phrase "subset of a set" refers to a part of the set that comprises at least one of the elements of said set. In other words, in this document an empty set, which as such is logically a subset of any set, is not understood as a subset. In a critical case, a subset can consist of all the elements of said set, in which case the subset is equal to said set. Said first and second subsets can be either separate, so that the first and second subsets do not have common elements, or they can be completely or partially overlapping, so that the first and second subsets have at least one element in common.

The various embodiments of the invention are characterized by what is set forth in the dependent claims.

BRIEF DESCRIPTION OF THE DRAWINGS

The invention is explained in more detail below, with reference to the preferred embodiments described by way of example, and to the appended Figures, where.

DETAILED DESCRIPTION OF THE EMBODIMENTS OF THE INVENTION

Figure 1:
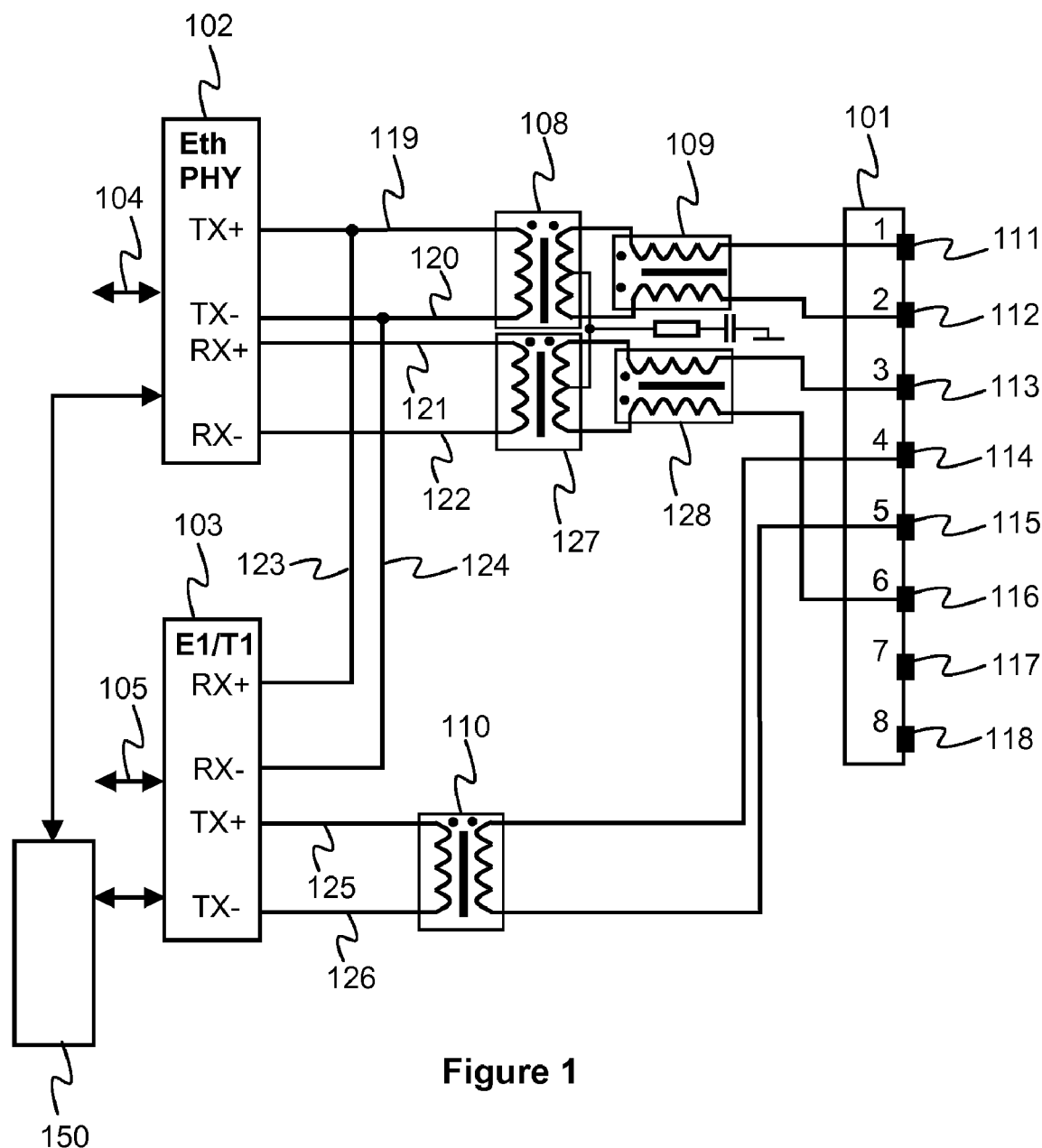
FIG. 1 illustrates a wiring diagram of a physical data transmission port according to an embodiment of the invention.

FIG. 1 illustrates a wiring diagram of a physical data transmission port according to an embodiment of the invention. The physical data transmission port includes an electric connector 101, provided with a set of connecting poles 111-118. Said physical data transmission port has first signal paths for connecting the connecting poles 111, 112, 113 and 116 belonging to a first subset of said set according to a first wiring standard to a first interface unit 102 that is arranged to support a first data transmission protocol. The physical data transmission port has second signal paths for connecting the connecting poles 111, 112, 114 and 115 belonging to a second subset of said set according to a second wiring standard to a second interface unit 103 that is arranged to support a second data transmission protocol. The interface units 102 and 103 are provided with connector ports 104 and 105 for connecting the interface units to other parts of the network element, such as for example to a network and/or control processor.

Said first and second signal paths are composed of elements that are arranged to transmit electric signals between the interface units 102 and 103 and between the connecting poles 111-118. In the exemplary connection illustrated in FIG. 1, the signal paths include electric conductors 119-126, isolation transformers 108, 110 and 127 as well as common mode chokes 109 and 128. All electric conductors illustrated in FIG. 1 are not provided with reference numbers. It is pointed out that the common mode chokes and/or isolating transformers illustrated in FIG. 1 are not necessary in all embodiments of the invention. For example a common mode choke and/or isolating transformer can be installed in a data cable that is connected to an electric connector 101 illustrated in FIG. 1. Said cable is not illustrated FIG. 1.

The connecting pole 111-118 can be for example a pin that is arranged to be inserted in the recess provided in the counterpart of the electric connector 101 and to form a galvanic contact with the walls of said recess as a response to a situation where the electric connector and its counterpart are mechanically interconnected. Said counterpart is not illustrated FIG. 1. In another example, the connecting pole 111-118 can be a recess in which the pin provided in the counterpart of the electric connector 101 can be inserted.

In a physical data transmission port according to an embodiment of the invention, said first wiring standard is an RJ45 queuing standard, and said second wiring standard is an RJ48c wiring standard. Now the electric connector is advantageously an eight-pole RJ connector with connecting poles that are numbered as 1-8. In the RJ48c wiring standard:
the connecting pole 1 is connected to the positive phase TX+ of the transmission port,
the connecting pole 2 is connected to the negative phase TX− of the transmission port,
the connecting pole 3 is connected to the positive phase RX+ of the reception port, and
the connecting pole 6 is connected to the negative phase RX− of the reception port.
In the RJ45 wiring standard:
the connecting pole 1 is connected to the positive phase RX+ of the reception port,
the connecting pole 2 is connected to the negative phase RX− of the reception port,
the connecting pole 4 is connected to the positive phase TX+ of the transmission port, and
the connecting pole 5 is connected to the negative phase TX− of the transmission port.

As is apparent from FIG. 1, between the connecting pole 111-118 and the interface unit 102 or 103, there is not necessarily arranged a galvanic contact. The signal can also proceed for example by intermediation of a magnetic field in the transformer arranged between the connecting pole and the interface unit.

A physical data transmission port according to an embodiment of the invention is arranged to set a first predetermined value for the identification variable as a response to a situation where data traffic according to the first data transmission protocol arrives in the electric connector 101, and to set a second predetermined value for said identification variable as a response to a situation where data traffic according to the second data transmission protocol arrives in the electric connector 101. In addition, the physical data transmission port can also be arranged to signal said identification variable to the other parts of the network element, such as a network processor and/or control processor. Now the network element is automatically capable of adapting to the data traffic connected to the physical data transmission port.

A physical data transmission port according to an embodiment of the invention is provided with a control unit 150 that is arranged to observe the signal in the reception port (RX+, RX−) of the interface unit 102 and to define whether said signal represents data transmission packets or frames according to the first data transmission protocol. Respectively, the control unit 150 is arranged to observe the signal in the reception port (RX+, RX−) of the interface unit 103 and to define whether said signal represents data transmission packets or frames according to the second data transmission protocol. The identification unit 150 is arranged to signal the identification result to the other parts of the network element, such as a network processor and/or a control processor.

In a physical data transmission port according to an embodiment of the invention, the interface unit 102 is arranged to identify whether the signal received in the reception port (RX+, RX−) of the interface unit 102 represents data packets or frames according to the first data transmission protocol, and the interface unit 103 is arranged to identify whether the signal received in the reception port (RX+, RX−) of the interface unit 103 represents data packets or frames according to the second data transmission protocol. The interface units 102 and 103 are arranged to signal the identification results to the other parts of the network element, such as to the network processor and/or the control processor.

In a physical data transmission port according to an embodiment of the invention, said first data transmission protocol is a packet switched 10/100 Ethernet and said second data transmission protocol is a time slot switched E1/T1. Ethernet is described for instance in the technical specification IEEE802.3 (Institute of Electrical and Electronics Engineers), E1 is described for instance in the technical specification ITU-T G.703 (International Telecommunications Union) and T1 is described for instance in the technical specification ANSI T1.102 (American National Standardization Institute). Thus said first interface unit 102 is advantageously a 10/100 Ethernet interface circuit (Ethernet PHY circuit) and said second interface unit 103 is advantageously an E1/T1 frame and interface circuit.

In a physical data transmission port according to an embodiment of the invention, said first data transmission protocol is a packet switched 10/100 Ethernet, said first wiring standard is an RJ45 wiring standard, said second data transmission protocol is a time slot switched E1/T1 and said second wiring standard is an RJ48c wiring standard.

In a physical data transmission port according to an embodiment of the invention, said first signal paths comprise an isolating transformer 108, 127 that is arranged to form a galvanic isolation between the connecting poles 111, 112, 113 and 116 belonging to said first subset and said first interface unit 102.

In a physical data transmission port according to an embodiment of the invention, said first signal paths comprise a common mode choke 109 that is arranged to attenuate the common mode current passing via the connecting poles 111 and 112 belonging to said first subset.

In a physical data transmission port according to an embodiment of the invention, said second signal paths comprise an isolating transformer 108, 110 that is arranged to form a galvanic isolation between the connecting poles 111, 112, 114 and 115 belonging to said second subset and said second interface unit 103.

Figure 2:
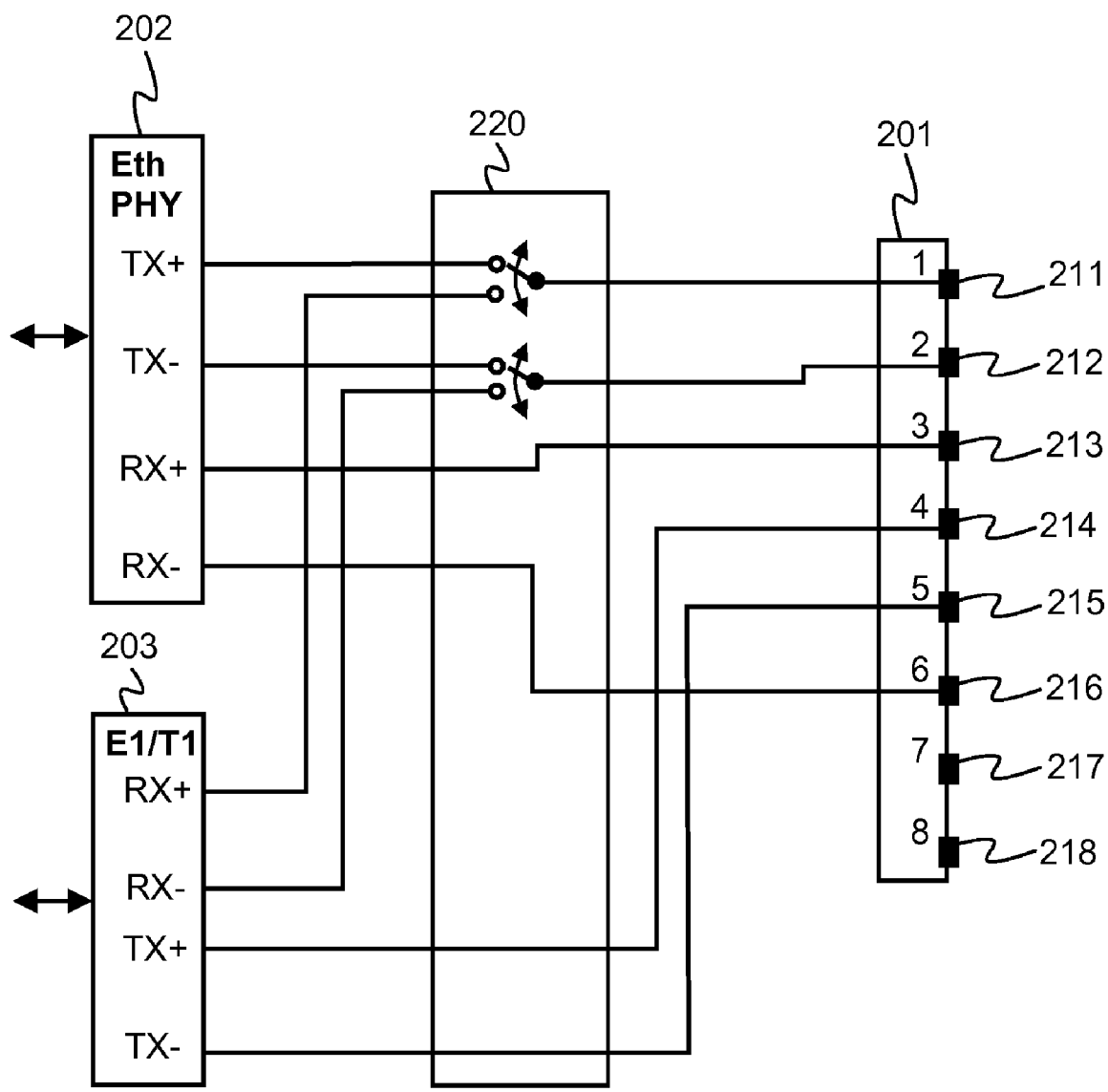
FIG. 2 illustrates a wiring diagram of another physical data transmission port according to an embodiment of the invention.

FIG. 2 illustrates the wiring diagram of a physical data transmission port according to an embodiment of the invention. The physical data transmission port includes an electric connector 201 provided with a set of connecting poles 211-218. The physical data transmission port has first signal paths for connecting the connecting poles 211, 212, 213 and 216 belonging to a first subset of said set according to a first wiring standard to the first interface unit 202 that is arranged to support the first data transmission protocol. The physical data transmission port has second signal paths for connecting the connecting poles 211, 212, 214 and 215 belonging to a second subset of said set according to a second wiring standard to the second interface unit 203 that is arranged to support the second data transmission protocol. Said first signal paths and said second signal paths comprise a changeover switch 220 having a first functional position and a second functional position. In the first functional position, the changeover switch 220 is arranged to connect the connecting poles 211 and 212 to the interface unit 202. In the second functional position, the changeover switch 220 is arranged to switch the connecting poles 211 and 212 to the interface unit 203.

A physical data transmission port according to a preferred embodiment of the invention is provided with a changeover switch 220 that is realized by means of an electromechanic relay switch.

A physical data transmission port according to an embodiment of the invention is provided with a changeover switch 220 that is realized by means of a static semiconductor switch.

Figure 3:
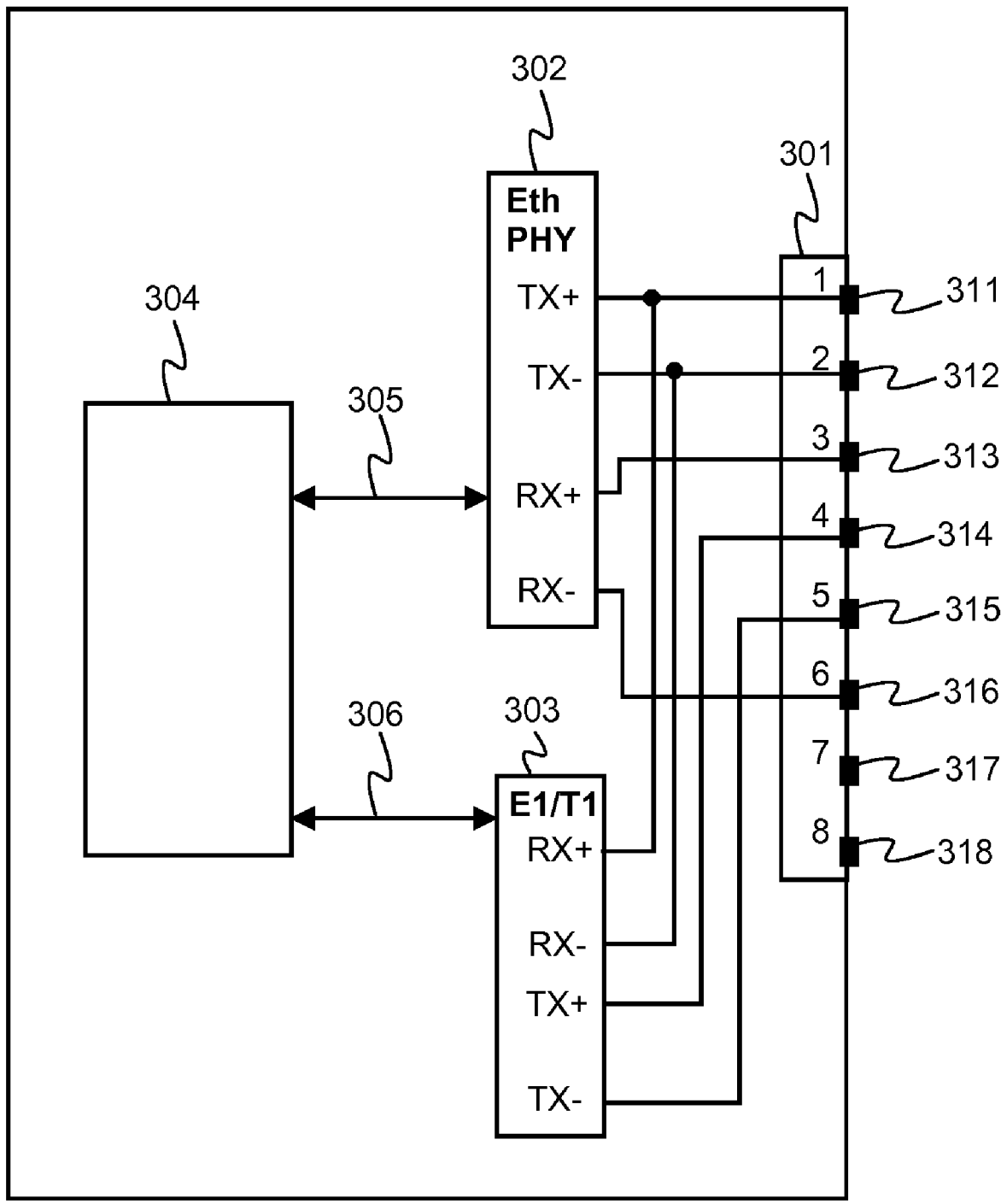
FIG. 3 illustrates a network element according to an embodiment of the invention.

FIG. 3 illustrates a network element according to an embodiment of the invention. The network element includes an electric connector 301 provided with a set of connecting poles 311-318. Said network element comprises a first interface unit 302 that is arranged to support a first data transmission protocol. The network element comprises a second interface unit 303 that is arranged to support a second data transmission protocol. The network element has first signal paths for connecting the connecting poles 311, 312, 313 and 316 belonging to a first subset of said set according to a first wiring standard to said first interface unit 302. The network element has second signal paths for connecting the connecting poles 311, 312, 314 and 315 belonging to a second subset of said set according to a second wiring standard to said second interface unit 303. The interface units 302 and 303 are provided with connector ports 305 and 306 for connecting the interface units to other parts of the network element 304, for instance to a network processor and/or a control processor.

A network element according to an embodiment of the invention is a mobile phone network loop access multiplexer, such as a cross connection and routing device arranged between a base station and a base station controller.

A network element according to an embodiment of the invention is arranged to set a first predetermined value for the identification variable as a response to a situation where data traffic according to the first data transmission protocol arrives in the electric connector 301, and to set a second predetermined value for said identification variable as a response to a situation where data traffic according to the second data transmission protocol arrives in the electric connector 301. On the basis of said identification variable, the network element is capable of automatically adapting to the data traffic connected to the electric connector 301.

As is obvious for a man skilled in the art, the invention and its various embodiments are not restricted to the above described embodiments only, but the invention and its embodiments can be modified within the scope of the independent claim. For instance, a physical data transmission port according to the invention can be arranged to support some other wiring standards than said RJ48c and RJ45 mentioned in the above examples. Respectively, the interface units can support some other data transmission protocols than said 10/100 Ethernet and E1/T1 mentioned in the above examples. In addition, the physical data transmission port according to the invention can support more than two wiring standards.

What is claimed is:

1. A physical data transmission port comprising:
an electric connector provided with a set of connecting poles,
first signal paths for connecting the connecting poles belonging to a first subset of said set according to a first wiring standard to a first interface unit that is arranged to support a packet switched 10/100 Ethernet data transmission protocol, and
second signal paths for connecting the connecting poles belonging to a second subset of said set according to a second wiring standard to a second interface unit that is arranged to support a time slot switched E1/T1 data transmission protocol,
wherein the physical data transmission port is a single port in a network element and is arranged to be connectable to a data cable through which the network element transmits and/or receives digital data.

2. A physical data transmission port according to claim 1, wherein said first wiring standard is an RJ45 wiring standard and said second wiring standard is an RJ48c wiring standard.

3. A physical data transmission port according to claim 1, wherein said first signal paths comprise an isolating transformer that is arranged to form a galvanic isolation between the connecting poles belonging to said first subset and said first interface unit.

4. A physical data transmission port according to claim 1, wherein said first signal paths comprise a common mode choke that is arranged to attenuate the common mode current passing via the connecting poles belonging to said first subset.

5. A physical data transmission port according to claim 1, wherein said second signal paths comprise an isolating transformer that is arranged to form a galvanic isolation between the connecting poles belonging to said second subset and said second interface unit.

6. A physical data transmission port according to claim 1, wherein the physical data transmission port is arranged to set a first predetermined value for an identification variable as a response to a situation where data traffic according to the packet switched 10/100 Ethernet data transmission protocol arrives in said electric connector, and to set a second predetermined value for said identification variable as a response to a situation where data traffic according to the time slot switched E1/T1 data transmission protocol arrives in said electric connector.

7. A physical data transmission port comprising:
an electric connector provided with a set of connecting poles,
first signal paths for connecting the connecting poles belonging to a first subset of said set according to a first wiring standard to a first interface unit that is arranged to support a packet switched 10/100 Ethernet data transmission protocol, and
second signal paths for connecting the connecting poles belonging to a second subset of said set according to a second wiring standard to a second interface unit that is arranged to support a time slot switched E1/T1 data transmission protocol,
wherein said first signal paths and said second signal paths comprise a changeover switch having a first functional position and a second functional position, in which first functional position said changeover switch is arranged to connect the connecting poles belonging to said first subset according to a first wiring standard to said first interface unit, and in which second functional position said changeover switch is arranged to connect the connecting poles belonging to said second subset according to a second wiring standard to said second interface unit.

8. A physical data transmission port according to claim 7, wherein said changeover switch is an electromechanic relay switch.

9. A physical data transmission port according to claim 7, wherein said changeover switch is a static semiconductor switch.

10. A network element comprising:
a single physical data transmission port that is connectable to a data cable through which the network element transmits and/or receives digital data,
wherein the single physical data transmission port comprises,
an electric connector provided with a set of connecting poles,
a first interface unit that is arranged to support a packet switched 10/100 Ethernet data transmission protocol,
a second interface unit that is arranged to support a time slot switched E1/T1 data transmission protocol,
first signal paths for connecting the connecting poles belonging to a first subset of said set according to a first wiring standard to said first interface unit, and
second signal paths for connecting the connecting poles belonging to a second subset of said set according to a second wiring standard to said second interface unit.

11. A network element according to claim 10, wherein the network element is a mobile phone network loop access multiplexer, such as a cross connection and routing device placed between a base station and a base station controller.

12. A network element according to claim 10, wherein the network element is arranged to set a first predetermined value for an identification variable as a response to a situation where data traffic according to the packet switched 10/100 Ethernet data transmission protocol arrives in said electric connector, and to set a second predetermined value for said identification variable as a response to a situation where data traffic according to the time slot switched E1/T1 data transmission protocol arrives in said electric connector.

* * * * *